(12) United States Patent
Wei et al.

(10) Patent No.: US 11,942,112 B1
(45) Date of Patent: Mar. 26, 2024

(54) METHOD FOR STARTING HARD DISKS AND ELECTRONIC DEVICE

(71) Applicant: Fulian Precision Electronics (Tianjin) Co., LTD., Tianjin (CN)

(72) Inventors: Wei Wei, Tianjin (CN); Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/130,389

(22) Filed: Apr. 3, 2023

(30) Foreign Application Priority Data

Oct. 28, 2022 (CN) .......................... 202211338886.1

(51) Int. Cl.
  *G11B 5/00* (2006.01)
  *G11B 5/54* (2006.01)
  *G11B 20/10* (2006.01)
(52) U.S. Cl.
  CPC ................................. *G11B 20/10* (2013.01)
(58) Field of Classification Search
  CPC .......... G11B 5/00; G11B 27/36; G11B 20/18; G11B 15/52; G11B 5/54; G06F 3/064; G06F 3/0608; G06F 3/0631; G06F 3/0659; G06F 3/0689
  USPC ....................................................... 360/75, 48
  See application file for complete search history.

(56) References Cited

U.S. PATENT DOCUMENTS 9,268,396 B2 * 2/2016 Wu ........................ G06F 1/3287

FOREIGN PATENT DOCUMENTS

| CN | 115129566 A | 9/2022 |
| TW | 200607215 A | 2/2006 |

* cited by examiner

*Primary Examiner* — Nabil Z Hindi
(74) *Attorney, Agent, or Firm* — ScienBiziP, P.C.

(57) ABSTRACT

A method for starting hard disks, applied in an electronic device, the method includes: starting a storage in the electronic device, and the storage comprising hard disks and a backplane extension chip; sending preset request signals by the hard disks to the backplane extension chip; verifying a number of the hard disks by the backplane expansion chip according to the request signals; when the number of the hard disks is verified successfully, performing type verification on the hard disks by the backplane expansion chip; and sending a start signal by the backplane expansion chip to the target hard disks having a successful type verification according to a preset start sequence and a preset number of the hard disks, to start the target hard disks.

20 Claims, 4 Drawing Sheets

FIG.3

METHOD FOR STARTING HARD DISKS AND ELECTRONIC DEVICE

This application claims priority to Chinese Patent Application No. 202211338886.1 filed on Oct. 28, 2022, in China National Intellectual Property Administration, the contents of which are incorporated by reference herein.

FIELD

The subject matter herein generally relates to a storage technology field, in particular, relates to a method for starting hard disks and an electronic device.

BACKGROUND

When a storage includes multiple hard disks that starts at boot time, all the hard disks of the storage will start up simultaneously, resulting in a high instantaneous power. Excessive instantaneous power will cause equipment safety issues and easily lead to data security issues.

BRIEF DESCRIPTION OF THE DRAWINGS

Implementations of the present disclosure will now be described, by way of embodiment, with reference to the attached figures.

FIG. 3 is a schematic diagram of one embodiment of sending a start signal.

DETAILED DESCRIPTION

Figure 1:
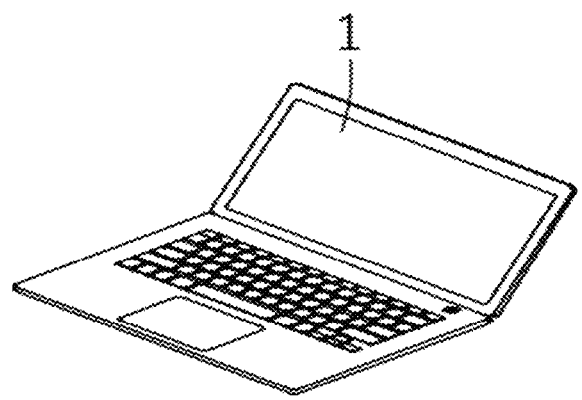
FIG. 1 is a schematic diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a schematic diagram of one embodiment of an electronic device. A method for starting hard disks can be applied in one or more electronic devices 1. In one embodiment, the electronic device 1 is a device that can automatically perform calculation of parameter value and/or information processing according to pre-set or stored instructions. In one embodiment, hardware of the electronic device 1 includes, but is not limited to a microprocessor, an Application Specific Integrated Circuit (ASIC), a Field-Programmable Gate Array (FPGA), a Digital Signal Processor (DSP), or an embedded device, etc.

In one embodiment, the electronic device 1 can be any electronic product that can interact with a user, such as a personal computer, a tablet computer, a smart phone, a Personal Digital Assistant (PDA), a game console, and an Internet Protocol Television (IPTV), a smart wearable device, etc.

In one embodiment, the electronic device 1 may also include a network equipment and/or a user equipment. In one embodiment, the network device includes, but is not limited to, a single network server, a server group consisting of multiple network servers, or a cloud computing-based cloud consisting of a large number of hosts or network servers.

In one embodiment, a network connected to the electronic device 1 includes, but is not limited to, the Internet, a wide area network, a metropolitan area network, a local area network, and a Virtual Private Network (VPN).

Figure 2:
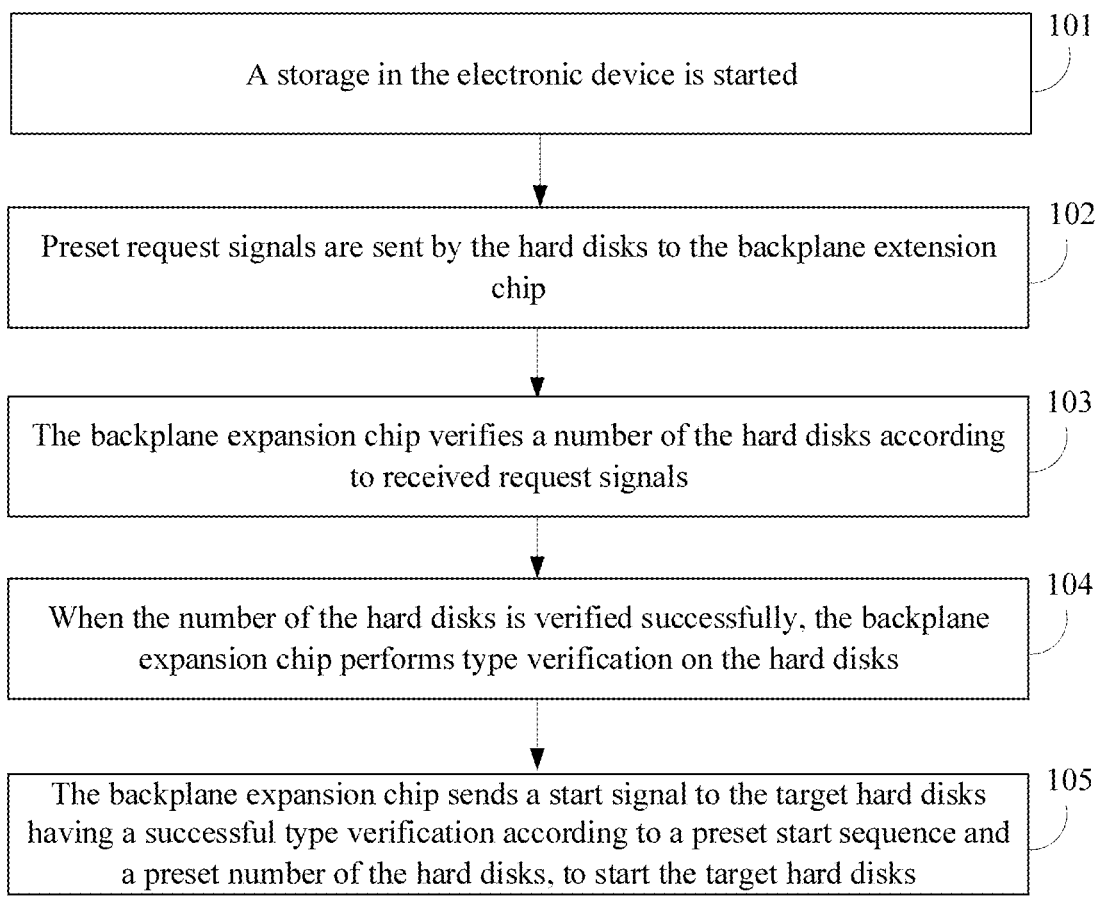
FIG. 2 is a flowchart of one embodiment of a method for starting hard disks.

FIG. 2 illustrates the method for starting hard disks. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The method is executed by an electronic device, such as the electronic device 1 shown in FIG. 1. The example method can begin at block 101.

At block 101, a storage in the electronic device is started.

In at least one embodiment of present disclosure, the storage includes hard disks and a backplane extension chip. For example, the storage may be the storage 12 in FIG. 4 and FIG. 5. As shown in FIG. 5, a schematic structural diagram of the storage of the method for starting hard disks provided by one embodiment of the present disclosure is illustrated. The backplane expansion chip can be a backplane expansion chip 122 in FIG. 5, and the hard disks includes n hard disks, and n is an integer. The hard disks may be SAS (Serial Attached SCSI) interface hard disks, and the backplane expansion chip may be a SAS Expander chip.

In at least one embodiment of the present disclosure, the electronic device is powered by a power supply, so that the storage can be started.

At block 102, preset request signals are sent by the hard disks to the backplane extension chip.

In at least one embodiment of the present disclosure, the request signal is a spin up request signal.

In at least one embodiment of the present disclosure, before the hard disks sending the preset request signals to the backplane extension chip, the method further includes: the electronic device generates out-of-band signals (OOB), and negotiates a protocol of the hard disks according to the out-of-band signals.

In one embodiment, the protocol may be a serial port SCSI protocol (Serial Attached SCSI, SAS), and the out-of-band signals include COMRESET signals, COMINIT signals, and COMWAKE signals. The COMRESET signals have a same composition as the COMINIT signals. The COMRESET signals can only be sent by the electronic device to the hard disks, and the COMINIT signals can only be sent by the hard disks to the electronic device.

After a negotiation of the protocol is completed, the electronic device performs speed negotiation with the hard disks, and after the speed negotiation is completed, reset operations are performed sequentially. After the reset operations are completed, the hard disks send spin up request signals to the backplane expansion chip.

In one embodiment, negotiating the protocol of the hard disks according to the out-of-band signals includes: the electronic device sends COMRESET signals to the hard disks, and receives COMINIT signals returned from the hard disks in response to the COMRESET signals. After receiving the COMINIT signals, the electronic device sends the COMWAKE signals to the hard disks. When the electronic device receives response signals returned from the hard disks in response to the COMWAKE signals, the electronic device determines that the negotiation of the protocol of the hard disks is completed.

In one embodiment, the hard disks directly send spin up signals to the backplane expansion chip by a physical layer (Phy layer) of the SAS protocol, and do not need to perform signal interaction by other layers of the SAS protocol. Since it is more convenient to directly send spin up signals to the backplane expansion chip by the physical layer of the SAS protocol than by other layers, a response speed between the backplane expansion chip and the hard disks is improved.

At block 103, the backplane expansion chip verifies a number of the hard disks according to received request signals.

In at least one embodiment of the present disclosure, the backplane expansion chip verifying the number of the hard disks according to the request signals, includes: the backplane expansion chip calculates the number of the request signals, and when the number of the request signals is equal to a preset number, the backplane expansion chip determines that the number of the hard disks is verified successfully; or when the number of the request signals is less than the preset number, the backplane expansion chip determines that the number of the hard disks is verified unsuccessfully.

In one embodiment, the preset number includes a number of all hard disks in the electronic device. In one embodiment, if the number of the hard disks is not verified successfully, the backplane expansion chip generates an alarm and displays the alarm. The alarm can be set by itself, which is not limited in the preset disclosure. For example, the alarm can be "the hard disk is not supported, please confirm". In another embodiment, when the number of the request signals is greater than the preset number, the user can be reminded to confirm whether the preset number is correct or whether the preset number needs to be updated (for example, the number of hard disks has increased, but the preset number has not been updated accordingly), and the user can also be reminded of abnormal verification and prompted to perform verification again.

Through above embodiments, it can be determined whether all the hard disks in the electronic device have sent the request signals to the backplane expansion chip by verifying the number of the hard disks.

At block 104, when the number of the hard disks is verified successfully, the backplane expansion chip performs type verification on the hard disks.

In at least one embodiment of the present disclosure, when the number of the hard disks is verified successfully, the backplane expansion chip performing the type verification on the hard disks, includes: the backplane expansion chip obtains a type identification code of each of the hard disks; when the type identification code of each of the hard disk is the same as a preset type identification code, the backplane expansion chip determines that the type verification of the hard disks is successful; or when the type identification code of any hard disk is different from the preset type identification code, the backplane expansion chip determines that the type verification of any hard disks is unsuccessful.

In one embodiment, the type identification code includes the type identification code of each of the hard disks in the electronic device, and the type identification code corresponds to the type of each of the hard disks one by one. The types of then hard disks include, but are not limited to, SATA (Serial Advanced Technology Attachment) interface hard disks or SAS interface hard disks.

For example, if the type of one hard disk is the SATA interface hard disk, the type identification code is 0x20. The preset type identification code can be set by itself, and the present disclosure is not limited.

In one embodiment, the type verification of the hard disks can determine whether the electronic device supports operations of the hard disks, so that signal line serial numbers corresponding to the target hard disks having the hard disk type supported by the electronic device, can be accurately obtained, and then a start sequence of the target hard disk can be controlled.

At block 105, the backplane expansion chip sends a start signal to the target hard disks having a successful type verification according to a preset start sequence and a preset number of the hard disks, to start the target hard disks.

In at least one embodiment of the present disclosure, the preset start sequence includes a spin up startup sequence, and the spin up startup sequence includes the signal line serial numbers of high-speed signal lines corresponding to all target hard disks. For example, the signal line serial numbers can be 8, 9, 10, 11, 12, etc., and the spin up start sequence can be {8, 9, 10, 11, 12}.

In at least one embodiment of the present disclosure, the start signal is a spin up start signal.

In at least one embodiment of the present disclosure, a generation method of the start sequence includes: the backplane expansion chip obtains the signal line serial numbers of the high-speed signal lines corresponding to the target hard disks; and further, the backplane expansion chip sorts the signal line serial numbers, and generates the start sequence according to sorted signal line serial number.

In one embodiment, the signal line serial numbers can be flexibly sorted, for example, the signal lines corresponding to the signal line serial numbers can be sorted in an ascending order or a descending order.

In at least one embodiment of the present disclosure, the backplane expansion chip sending the start signal to the target hard disks having a successful type verification according to the preset start sequence and the preset number of the hard disks, includes: the backplane expansion chip performs an initial transmission operation.

In one embodiment, the backplane expansion chip performing the initial transmission operation includes: a target signal line serial number is selected from the start sequence according to the number of started hard disks, and the start signal is sent to the target hard disk corresponding to the target signal line serial number according to the target signal line serial number; after a preset time interval, the backplane expansion chip performs a next transmission operation until the start signal is sent to all target hard disks.

In one embodiment, a generation method of the number of started hard disks includes: the backplane expansion chip obtains hard disk parameters of each of the target hard disks; further, the backplane expansion chip obtains an overshoot current value of each of the target hard disks from the hard disk parameters, and obtains a power supply current value of a power supply of the electronic device; further, based on the power supply current value and the overshoot current value, the backplane expansion chip determines an upper limit value of the number of the started hard disks; further, the backplane expansion chip generates the number of the started hard disks according to the upper limit value.

In one embodiment, the overshoot current value is an instantaneous current of each of the hard disk when it is started, and the instantaneous current will be large when the hard disk is started. The backplane expansion chip can randomly select a value greater than zero and less than or equal to the upper limit value as the number of the started hard disks.

In one embodiment, the backplane expansion chip determines a ratio between the power supply current value and the overshoot current value as the upper limit value of the started hard disk.

In one embodiment, a generation method of the time interval includes: the backplane expansion chip extracts a transition time of each of the target hard disks from the hard disk parameters of each of the target hard disks. Further, the backplane expansion chip calculates the time interval according to the transition time and a preset proportion coefficient.

In one embodiment, the transition time is a time taken for the overshoot current value of each of the hard disks to be reduced to a normal operation current value. For example, the transition time is 3 seconds. The preset proportion coefficient can be set by itself, and the present disclosure does not limit the preset proportion coefficient. For example, the preset proportion coefficient is 0.3.

In one embodiment, the backplane expansion chip calculating the time interval according to the transition time and the preset proportion coefficient includes: the backplane expansion chip multiplies the transition time and the preset proportion coefficient to obtain a product, and the backplane expansion chip takes a sum of the transition time and the product as the time interval.

For example, following the above example, if the transition time is 3 seconds and the preset proportion coefficient is 0.3, the time interval is about (3+3 transition time*0.3) seconds.

Figure 3:
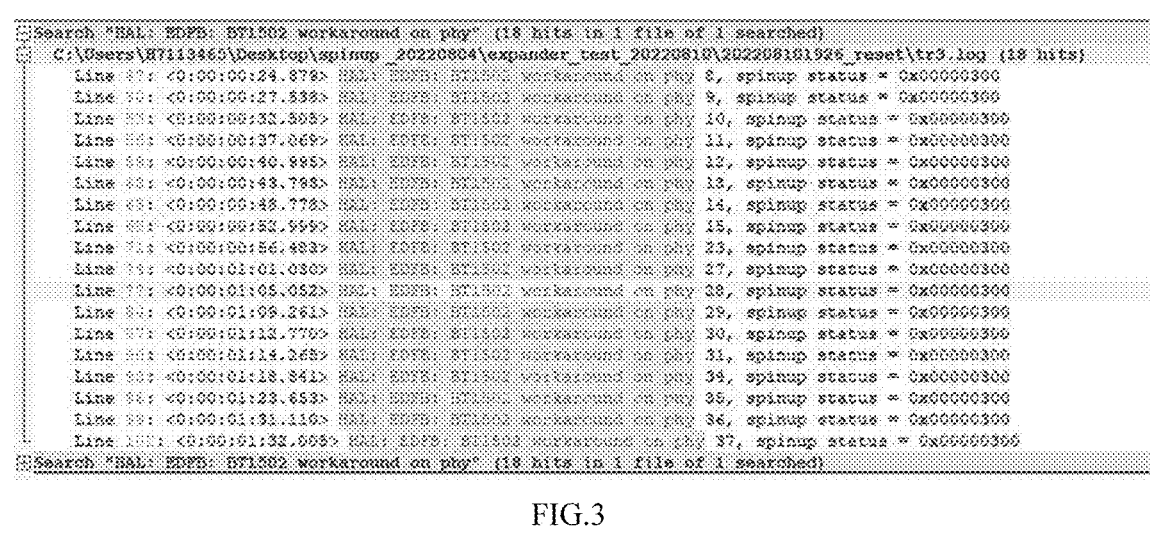

Referring to FIG. 3, FIG. 3 illustrates sending the start signal.

In FIG. 3, the time interval is about 4 seconds, and the number of the started hard disks is 1, the signal line serial numbers in the start sequence is phy8-phy37, and the signal line serial numbers are sorted in ascending order. It FIG. 3, the backplane expansion chip sends the start signal to the hard disk corresponding to the target signal line serial number every 4 seconds according to the target signal line serial number.

In one embodiment, because the transition time is the time it takes to reduce the overshoot current value of each target hard disk to the normal operation current, and the number of the started hard disks is less than or equal to the upper limit value of the number of the started hard disks, therefore, it can be ensured that a sum of the instantaneous starting current of the target hard disk having the number of the started hard disks is not greater than the power supply current value of the power supply. At a same time, because the interval time is generated according to the transition time, it can ensure that the overshoot current value of each target hard disk has enough time to recover to the normal operating current, realize an interleaved startup of the hard disks, and thus improving the safety of starting the hard disks.

It can be seen from the above technical scheme that the backplane expansion chip performs the number verification on the hard disks according to the received request signals. Through the number verification, it can be determined whether all the hard disks in the electronic device have sent the request signals to the backplane expansion chip. When all the hard disks have sent signals to the backplane expansion chip, the type verification of the hard disks can be performed, so that the hard disks supported by the electronic device can be selected. The backplane expansion chip performs the type verification on the hard disks. Through the type verification, it can be determined whether the type of each of the hard disks conforms to the type of the hard disk supported by the backplane expansion chip, thus improving reliability. The backplane expansion chip sends the start signal to the target hard disks having a successful type verification according to the preset start sequence and the preset number of the hard disks, to start the target hard disks. Since a sum of the starting current of the hard disks having the number of the started hard disks is less than or equal to the power supply current value of the power supply, it can ensure the safety when starting the hard disks having the number of the started hard disks. The interleaved startup of all target hard disks can be achieved through the time interval, which can reduce the instantaneous power of starting the hard disks, thus further improving the security of starting the hard disks.

Figure 4:
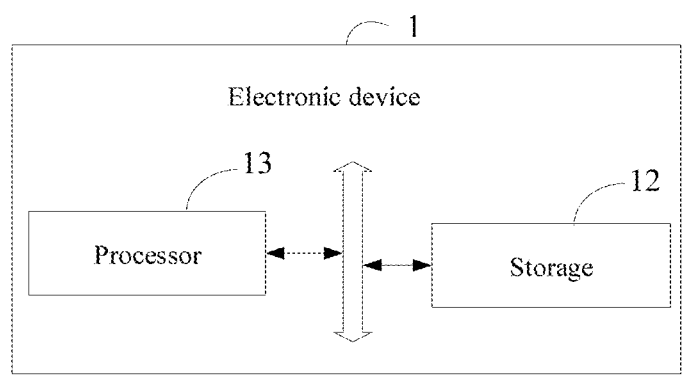
FIG. 4 is a structural diagram of one embodiment of an electronic device performing the method of FIG. 2.
Figure 5:
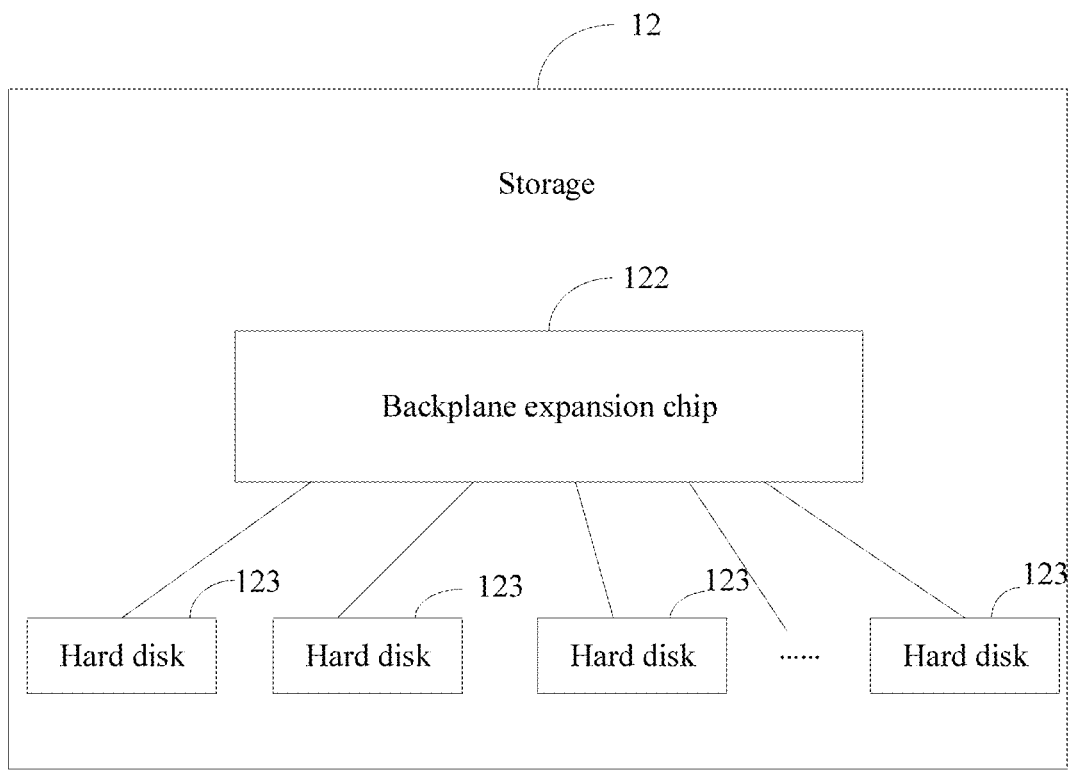
FIG. 5 is a structural diagram of one embodiment of a storage performing the method of FIG. 2.

FIG. 4 illustrates a structural diagram of an electronic device.

In one embodiment, the electronic device 1 includes, but is not limited to, a storage 12, a processor 13, and a computer program stored in the storage 12 and executed by the processor 13. For example, the computer program can be a program of starting the hard disk.

Those skilled in the art can understand that the schematic structural diagram is only an example of the electronic device 1, and does not constitute a limitation on the electronic device 1, other examples may include more or less components than the one shown, or combine some components, or have different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the method, for example, to implement each block shown in FIG. 2.

Exemplarily, the computer program can be divided into one or more modules/units, and the one or more modules/units are stored in the storage 12 and retrieved by the processor 13 to achieve the application of the method. The one or more modules/units may be a series of computer program instruction segments capable of performing specific functions, and the instruction segments describe the process of acquisition the computer program in the electronic device 1.

The storage 12 can be used to store the computer programs and/or modules, and the processor 13 executes or obtains the computer programs and/or modules stored in the storage 12, and calls up the data stored in the storage 12, such that various functions of the electronic device 1 are realized. The storage 12 may mainly include an area for storing programs and an area for storing data, wherein the area for storing programs may store an operating system, an application program required for at least one function (such as a sound playback function, an image playback function, etc.), and the like; the area for storing data may store the data created in the use of the electronic device 1. In addition, the storage 12 may include non-volatile storage such as hard disk, internal memory, plug-in hard disk, smart media card (SMC), Secure digital (SD) card, flash card, at least one disk storage, flash memory device, or other non-volatile solid state storage.

The storage 12 may be an external storage and/or an internal storage of the electronic device 1. Further, the storage 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the method implements all or part of the processes in the methods of the above embodiments, and can also be completed by instructing the relevant hardware through a computer program. The computer program can be stored in a computer-readable storage medium_, and when the computer program is acquired by the processor, the blocks of the method embodiments can be implemented.

The computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage 12 in the electronic device 1 stores a plurality of instructions to implement the method for starting hard disks, and the processor 13 can acquire the plurality of instructions to implement processes of: starting a storage in the electronic device, and the storage including hard disks and a backplane extension chip; the hard disks sending preset request signals to the backplane extension chip; the backplane expansion chip verifying a number of the hard disks according to received request signals; when the number of the hard disks is verified successfully, the backplane expansion chip performing type verification on the hard disks; and the backplane expansion chip sending a start signal to the target hard disks having a successful type verification according to a preset start sequence and a preset number of the hard disks, to start the target hard disks.

Specifically, for the specific implementation method of the above-mentioned instruction by the processor 13, reference may be made to the description of the relevant blocks in the corresponding embodiment of FIG. and details are not repeated.

In the several embodiments provided in this disclosure, it should be understood that the devices and methods disclosed can be implemented by other means. For example, the device embodiments described above are only schematic. For example, the division of the modules is only by logical function, and can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a forth of hardware or in a form of a software functional unit.

The above integrated modules implemented in the form of function modules may be stored in a storage medium. The above function modules may be stored in a storage medium, and include several instructions to enable a computing device or processor to execute the method described in the embodiment of the present disclosure.

The present disclosure is not limited to the details of the above-described exemplary embodiments, and the present disclosure can be embodied in other specific foams without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description only represents some embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for starting hard disks, applied in an electronic device, the method comprising:

starting a storage in the electronic device, the storage comprising hard disks; a backplane extension chip; and a backplane expansion chip;

sending preset request signals using the hard disks to the backplane extension chip;

verifying a number of the hard disks by the backplane expansion chip according to the request signals;

in response that the number of the hard disks is verified successfully, performing a type verification on the number of the hard disks by the backplane expansion chip; and sending start signal by the backplane expansion chip to target hard disks having a successful type verification according to a preset start sequence and a preset number of the hard disks, and starting the target hard disks according to the start signal.

2. The method for starting hard disks as recited in claim 1, wherein verifying the number of the hard disks by the backplane expansion chip according to the request signals comprises:

calculating the number of the request signals by the backplane expansion chip;

in response that the number of the request signals is equal to a preset number, determining that the number of the hard disks is verified successfully by using the backplane expansion chip; or in response that the number of the request signals is less than the preset number, determining that the number of the hard disks is verified unsuccessfully by using the backplane expansion chip.

3. The method for starting hard disks as recited in claim 1, wherein performing the type verification on the hard disks by the backplane expansion chip comprises:

obtaining a type identification code of each of the hard disks by using the backplane expansion chip;

in response that the type identification code of each of the hard disk is the same as a preset type identification code, determining that the type verification of the hard disks is successful by using the backplane expansion chip;

in response that the type identification code of any hard disk is different from the preset type identification code, determining that the type verification of any hard disks is unsuccessful by using the backplane expansion chip.

4. The method for starting hard disks as recited in claim 1, wherein generating the preset start sequence comprises:

obtaining signal line serial numbers of high-speed signal lines corresponding to the target hard disks by the backplane expansion chip; and sorting the signal line serial numbers by the backplane expansion chip, and generating the start sequence according to sorted signal line serial numbers.

5. The method for starting hard disks as recited in claim 4, wherein sending the start signal by the backplane expansion chip to the target hard disks having the successful type verification according to the preset start sequence and the preset number of the hard disks, comprises:

performing an initial transmission operation by the backplane expansion chip, comprising:

selecting a target signal line serial number from the start sequence according to a number of started hard disks; and sending the start signal to the target hard disk corresponding to the target signal line serial number according to the target signal line serial number;

after a preset time interval, performing a next transmission operation by the backplane expansion chip until the start signal is sent to all of the target hard disks.

6. The method for starting hard disks as recited in claim 1, wherein generating the number of started hard disk comprises:

obtaining hard disk parameters of each of the target hard disks by the backplane expansion chip;

obtaining an overshoot current value of each of the target hard disks from the hard disk parameters, and obtaining a power supply current value of a power supply of the electronic device;

based on the power supply current value and the overshoot current value, determining an upper limit value of the number of the started hard disks by using the backplane expansion chip;

generating the number of the started hard disks by using the backplane expansion chip according to the upper limit value.

7. The method for starting hard disks as recited in claim 5, wherein generating the time interval comprises:

extracting transition time of each of the target hard disks from the hard disk parameters of each of the target hard disks, by the backplane expansion chip; and calculating the time interval by the backplane expansion chip according to the transition time and a preset proportion coefficient.

8. The method for starting hard disks as recited in claim 7, wherein calculating the time interval by the backplane expansion chip according to the transition time and the preset proportion coefficient, comprises:

obtaining a product by multiplying the transition time and the preset proportion coefficient; and taking a sum of the transition time and the product as the time interval.

9. An electronic device comprising:

a processor; and a non-transitory storage medium, coupled to the processor, that stores a plurality of instructions, which cause the processor to:

start a storage in the electronic device, the storage comprising hard disks; a backplane extension chip; and a backplane expansion chip;

send preset request signals using the hard disks to the backplane extension chip;

verify a number of the hard disks by the backplane expansion chip according to the request signals;

in response that the number of the hard disks is verified successfully, perform a type verification on the number of the hard disks by the backplane expansion chip; and send start signal by the backplane expansion chip to target hard disks having a successful type verification according to a preset start sequence and a preset number of the hard disks, and start the target hard disks according to the start signal.

10. The electronic device as recited in claim 9, wherein the plurality of instructions are further configured to cause the processor to:

calculate the number of the request signals by the backplane expansion chip;

in response that the number of the request signals is equal to a preset number, determine that the number of the hard disks is verified successfully by using the backplane expansion chip; or in response that the number of the request signals is less than the preset number, determine that the number of the hard disks is verified unsuccessfully by using the backplane expansion chip.

11. The electronic device as recited in claim 9, wherein the plurality of instructions are further configured to cause the processor to:
  obtain a type identification code of each of the hard disks by using the backplane expansion chip;
  in response that the type identification code of each of the hard disk is the same as a preset type identification code, determine that the type verification of the hard disks is successful by using the backplane expansion chip;
  in response that the type identification code of any hard disk is different from the preset type identification code, determine that the type verification of any hard disks is unsuccessful by using the backplane expansion chip.

12. The electronic device as recited in claim 9, wherein the plurality of instructions are further configured to cause the processor to:
  obtain signal line serial numbers of high-speed signal lines corresponding to the target hard disks by the backplane expansion chip; and
  sort the signal line serial numbers by the backplane expansion chip, and generate the start sequence according to sorted signal line serial numbers.

13. The electronic device as recited in claim 12, wherein the plurality of instructions are further configured to cause the processor to:
  perform an initial transmission operation by the backplane expansion chip, comprising:
  selecting a target signal line serial number from the start sequence according to a number of started hard disks; and
  sending the start signal to the target hard disk corresponding to the target signal line serial number according to the target signal line serial number;
  after a preset time interval, perform a next transmission operation by the backplane expansion chip until the start signal is sent to all of the target hard disks.

14. The electronic device as recited in claim 9, wherein the plurality of instructions are further configured to cause the processor to:
  obtain hard disk parameters of each of the target hard disks by the backplane expansion chip;
  obtain an overshoot current value of each of the target hard disks from the hard disk parameters, and obtain a power supply current value of a power supply of the electronic device;
  based on the power supply current value and the overshoot current value, determine an upper limit value of the number of the started hard disks by using the backplane expansion chip;
  generate the number of the started hard disks according to the upper limit value by using the backplane expansion chip according to the upper limit value.

15. The electronic device as recited in claim 13, wherein the plurality of instructions are further configured to cause the processor to:
  extract transition time of each of the target hard disks from the hard disk parameters of each of the target hard disks, by the backplane expansion chip; and
  calculate the time interval by the backplane expansion chip according to the transition time and a preset proportion coefficient.

16. The electronic device as recited in claim 15, wherein the plurality of instructions are further configured to cause the processor to:
  obtain a product by multiply the transition time and the preset proportion coefficient; and
  take a sum of the transition time and the product as the time interval.

17. A non-transitory storage medium having stored thereon instructions that, when executed by at least one processor of an electronic device, causes the least one processor to execute instructions of a method for starting hard disks, the method comprising:
  starting a storage in the electronic device, the storage comprising hard disks; a backplane extension chip; and a backplane expansion chip;
  sending preset request signals using the hard disks to the backplane extension chip;
  verifying a number of the hard disks by the backplane expansion chip according to the request signals;
  in response that the number of the hard disks is verified successfully, performing a type verification on the number of the hard disks by the backplane expansion chip; and
  sending start signal by the backplane expansion chip to target hard disks having a successful type verification according to a preset start sequence and a preset number of the hard disks, and start the target hard disks according to the start signal.

18. The non-transitory storage medium as recited in claim 17, wherein the method comprising:
  calculating the number of the request signals by the backplane expansion chip;
  in response that the number of the request signals is equal to a preset number, determining that the number of the hard disks is verified successfully by using the backplane expansion chip;
  in response that the number of the request signals is less than the preset number, determining that the number of the hard disks is verified unsuccessfully by using the backplane expansion chip.

19. The non-transitory storage medium as recited in claim 17, wherein the method comprising:
  obtaining a type identification code of each of the hard disks by using the backplane expansion chip;
  when the type identification code of each of the hard disk is the same as a preset type identification code, the backplane expansion chip determining that the type verification of the hard disks is successful; or
  in response that the type identification code of any hard disk is different from the preset type identification code, determining that the type verification of any hard disks is unsuccessful by using the backplane expansion chip.

20. The non-transitory storage medium as recited in claim 17, wherein the method comprising:
  obtaining signal line serial numbers of high-speed signal lines corresponding to the target hard disks by the backplane expansion chip; and
  sorting the signal line serial numbers by the backplane expansion chip, and generating the start sequence according to sorted signal line serial numbers.

* * * * *